United States Patent [19]
Rockenfeller

[11] Patent Number: 5,384,101
[45] Date of Patent: Jan. 24, 1995

[54] METHOD AND APPARATUS FOR ACHIEVING HIGH REACTION RATES IN SOLID-GAS REACTOR SYSTEMS

[75] Inventor: Uwe Rockenfeller, Boulder City, Nev.

[73] Assignee: Rocky Research, Boulder City, Nev.

[21] Appl. No.: 899,345

[22] Filed: Jun. 16, 1992

Related U.S. Application Data

[62] Division of Ser. No. 320,562, Mar. 8, 1989.

[51] Int. Cl.$^6$ .............................................. B01J 35/02
[52] U.S. Cl. ................................... 422/211; 422/221; 422/218; 62/112; 62/480; 96/10; 96/11
[58] Field of Search ............... 422/211, 218, 221; 55/208; 423/210; 165/104.12; 62/480, 102, 106, 112

[56] References Cited

U.S. PATENT DOCUMENTS

| | | | |
|---|---|---|---|
| 1,987,911 | 1/1935 | Prickett | 422/211 |
| 2,019,356 | 10/1935 | Normelli | 62/480 |
| 2,196,021 | 4/1940 | Merrill | 123/4.8 |
| 2,241,600 | 5/1941 | Hunsicker | 55/388 |
| 2,253,907 | 8/1941 | Levine | 62/480 |
| 2,326,130 | 8/1943 | Kleen | 62/179 |
| 2,384,460 | 9/1945 | Kleen | 62/5 |
| 2,496,459 | 2/1950 | Erland Af Kleen | 62/480 |
| 2,521,538 | 9/1950 | Rees | 422/218 |
| 2,537,720 | 1/1951 | Wagner | 62/117.85 |
| 2,649,700 | 8/1953 | Piper | 62/480 |
| 2,801,706 | 8/1957 | Asker | 55/208 |
| 2,945,554 | 7/1960 | Berly | 183/37 |
| 2,989,383 | 6/1961 | Miller | 422/211 |
| 3,167,399 | 1/1965 | Hansen, Jr. | 422/218 |
| 4,419,107 | 12/1983 | Roydhouse | 423/210 |
| 4,581,049 | 4/1986 | Januschkowetz | 62/480 |
| 4,709,558 | 12/1987 | Matsushita et al. | 62/480 |
| 4,801,308 | 1/1989 | Keefer | 55/25 |
| 4,906,258 | 3/1990 | Balat et al. | 55/74 |

FOREIGN PATENT DOCUMENTS 6645209 9/1965 Belgium .

OTHER PUBLICATIONS

Physique Appliques 18, S. Mauran, D. Bodiot et G. Crozat "Optimisation des densites energehiques de systemes de stockage chimique bases sur des reactions solide-gaz reversables" (Feb. 1983) pp. 107-112.

*Primary Examiner*—Robert J. Warden
*Assistant Examiner*—Hien Tran
*Attorney, Agent, or Firm*—Jerry R. Seiler

[57] ABSTRACT

Reaction rates in chemisorption reactions involving solid reactants and gaseous ligands are improved by maintaining optimized solid density throughout the reaction. Methods and apparatus which restrict volumetric solid expansion, compression of the solid reactant, and mixture with inert solid porous or particulate materials are disclosed.

15 Claims, 11 Drawing Sheets

METHOD AND APPARATUS FOR ACHIEVING HIGH REACTION RATES IN SOLID-GAS REACTOR SYSTEMS

This application is a divisional of application Ser. No. 07/320,562, filed Mar. 8, 1980.

BACKGROUND OF THE INVENTION

The use of complex compounds, zeolites, activated carbon, metal hydrides and metal oxide-hydroxide reaction compositions as heat pump working materials is known in the art. Complex compounds are materials formed by adsorption of gas molecules on a solid adsorbent. Suitable complex compounds comprise metal salts on which gaseous ligands such as water, ammonia, methanol, methane, ethane and the like are alternately adsorbed and desorbed. A number of such materials are described in co-pending applications Ser. Nos. 115,820, filed Nov. 2, 1987 and 162,016, filed Feb. 29, 1988 now U.S. Pat. No. 4,822,391 and 4,848,994, respectively. These complex compounds are highly advantageous in heat pump technology, thermal storage or in other heat-transfer systems, since they are relatively inexpensive, yield higher refrigerant density as compared to liquid-vapor media, and are useful in relatively simple and inexpensive heat pump apparatus. The specific complex compounds and their uses described in the aforesaid copending applications are incorporated herein by reference. Other solid-gas reaction systems, such as metal hydrides, inclusion compounds (zeolites and activated carbons), and metal oxide-hydroxide and metal oxide-carbonate reactions have application as heat pumps, refrigeration and power cycle working media, desiccants, scrubbers, adsorbents for solvent recovery, or thermal energy storage. The subject invention is applicable to all such systems.

Solid-gas adsorption and desorption reactions are generally accompanied by significant volume and density changes of the solid material. Such solid-gas reactions are typically conducted in fluidized beds, on flat plate heat exchange surfaces on which the solid reactant is located, or with heat transfer and gas flow tubes embedded in a mass of solid reactant. These systems allow free expansion of the solid reactant. However, if the solid is allowed to expand without restriction, a large void fraction results thereby substantially reducing composition density with concomitant reduction of thermal conductivity and reaction rates because of limited heat transfer in the solid mass and at the interface. It is an object of the present invention to reduce or obviate such problems.

SUMMARY OF THE INVENTION

The present invention comprises a method and apparatus for containing a solid reactant in a fixed volume reactor at optimum density not maintainable in conventional reactor systems while providing sufficient heat conduction whereby thermal paths are short and mass diffusion path length is independent of thermal path lengths. High density of the solid with concomitant increased thermal conductivity of the reactant and multiple thermal conduction paths provides a cost-effective means of decreasing reaction rate limitations imposed by poor heat transfer. These as well as other advantages will be evident from the following detailed description.

DETAILED DESCRIPTION OF THE INVENTION

Figure 1:
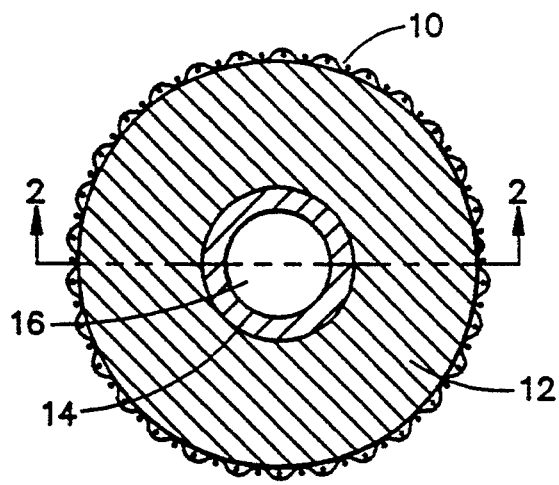
FIG. 1 is a top view of a first embodiment of the invention incorporating a series of plates spaced along a heat transfer tube with a column of wire mesh volumetric restraining means secured around the periphery of the trays.

Solid-gas or solid-vapor reactants comprise complex compounds which normally expand in volume between about 1.5 and about 10 times as the gas moiety is adsorbed into the solid component. The improvement of the invention in maintaining optimum reaction density by restricting volumetric expansion is particularly advantageous for systems incorporating the substantially expanding solids. In another embodiment of the invention in which solid compositions having relatively low expansion are used, the compositions are initially packed into the reaction chamber at density greater than the free, unpacked pour density, and maintained at the higher density throughout the reaction. In other substances, such as metal hydrides, inclusion compounds, and metal oxides, volumetric expansion ranges from that of the aforesaid complex compounds to near zero.

Salts which adsorb gaseous ligands and which are useful for the aforesaid purpose include nitrites, nitrates, oxalates, sulfates, sulfites and halides, particularly chlorides, bromides and iodides of alkali metals, alkaline earth metals, transition metals, zinc, copper, cadmium, tin and aluminum. Magnesium and manganese salts are also particularly useful as are double salts of the above metals gold, silver and cobalt with oxides of calcium, sodium, strontium, magnesium and manganese oxide. These salts are disclosed generally in the aforesaid copending applications the description of which are incorporated herein by reference. Complexes of these salts with ammonia, water, methanol and other lower alkanols, sulfur dioxide, polyamines, particularly lower alkyl diamines, carbon dioxide, phosphine and methylamine are most useful, although any of the aforesaid compounds are intended to be included within the scope of the invention.

As the complex compounds are formed by adsorption of the gaseous ligand on the solid material, substantial heat is created. This energy is to be recovered in the reactor by heat transfer plates, tubes or other heat exchange surfaces of the apparatus. Conversely, when the complex releases a portion or all of the gas moiety during a desorption phase, the solid complex compound decreases in volume, but to a lower extent, and at the same time absorbs heat, again with the energy being transferred through the heat exchange surfaces to which the compounds are exposed in the reactor. During such sorption reactions, it is important to maximize the reaction rates. Reaction rates are controlled by thermal conductance, mass transfer and intrinsic kinetics. Such rates are maximized by achieving high thermal conductivity of the solid for the energy transfer while also maintaining adequate porosity for diffusion or transfer of the gas. If the solid is allowed to expand without restraint, large void fractions in the solid structure result causing substantially reduced thermal conductivity thereby limiting the heat transfer and reaction rates. By maintaining density of the solid reactant different and typically greater than that of the reactant in its free sorbed state an optimal balance between thermal conductivity and porosity is achieved and reaction rates are maximized. Thus, the loading density of the unreacted solid sorbent is very important in obtaining preferred results.

According to the invention, these improvements and advantages are realized by maintaining the solid reactants at their optimum reaction densities during the reactions by restricting the volumetric expansion of the expandable solid complex compounds. More specifically, the volume of the reaction chambers in which the complex compounds are contained during reaction are limited by providing reactant containment means which creates closely spaced thermal conduction paths and also allows for passage of the reacting gases to and from the solid reaction adsorbent. The containment means comprises a variety of materials including wire mesh, perforated plates or tubing, or other materials including foams porous to gas. These materials are provided on at least one or more walls or barriers defining and surrounding the reaction chamber. The remainder of the walled reaction chamber may be the heat exchange surface and/or the conduit for the heat exchange fluid. Using such reaction chambers allows for adequate exposure and transfer of the gas into and from the solid reaction mass from outside of the reaction chamber, while at the same time affording good heat transfer within the reactor to and from the solid reaction mass. Optimization of the system involves providing the optimum relationship between the thickness of each reaction chamber, the loading density of reactant in the chambers, and the chamber depth, (diffusion length from gas passage to furthermost reactant). Spacing between plates or other barriers is adjusted as required to optimize thermal conduction path lengths and give proper system thermal conductance. In the systems utilizing the improvement of the invention, solid is maintained at densities (based on solid reactant mass) typically between 0.2 and 2.5 g/cc. The expansion of the solid is preferably limited to between about 1.1 and 4.5 times the initial volume of solid reactant introduced into a reaction chamber prior to exposure to the gaseous reactant. The solid reactant is also preferably introduced into a reaction chamber at a first, uncompressed density, and compressed to a second density, greater than the first density prior to exposure to the gaseous reactant. The preferred ratio of the first density: second density is between about 1:1.1 and about 1:4, respectively. Moreover, during the reaction, the reaction product may be expanded to a third density, less than the second density, with the preferred ratio of the first density: third density of between about 2:1 and about 1:4, respectively.

Figure 2:
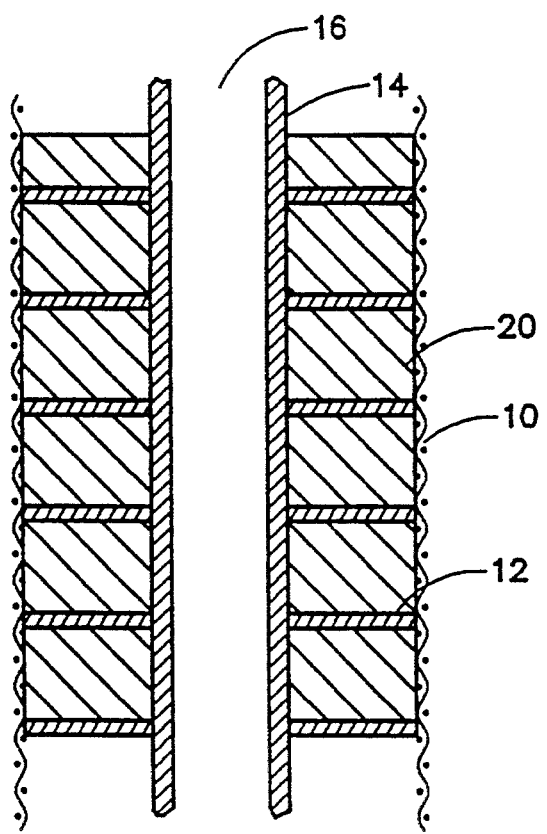
FIG. 2 is a sectional view taken along lines 2—2 of FIG. 1.

In FIGS. 1 and 2 there are illustrated a first means for restricting the solid reactant composition 20 which has been placed in a series of reaction chambers defined between heat transfer plates 12 mounted along heat transfer tube 14. The plates are shown as being annular in shape, although any suitable shape may be used as may the cross-sectional shape of the heat transfer tube to which they are secured. Around the outside of the reactor is a wire mesh 10 which provides free movement of the gaseous reactants to and from the solid reactant material as well as restraining expansion of the solid reactant within each of the reaction chambers. The heat transfer plates also provide for heat transfer to and from the solid reactant material and the heat transfer tubes. A suitable heat exchange fluid passes along the interior 16 of heat transfer tube 14.

The wire mesh is only one example of a volumetric expansion barrier which is porous or otherwise provides a path for the gaseous reactants. Typical mesh size will be about 250, although larger or smaller mesh may also be used. The particle size of the solid reactant is not so important, and it has been found that even particles that are smaller than the wire mesh opening size do not create a problem since the expansion barrier will be effective once the chemisorption reactions begin as the solid reaction mass will become somewhat stiffened. The solid complex compound is shown as substantially filling the reaction chambers as it will in an expanded condition. However, when initially charging a solid complex forming salt into the apparatus, particularly with substantially expanding solids it is usually preferred to charge the reaction chambers to less than full chamber volume, for example 40%–90%, thereby leaving some space for solid expansion. The invention also contemplates means for moving the reactor bed plates and/or the wire mesh to create reaction chambers having variable volumes to compensate for solid expansion and contraction as will be explained in more detail hereinafter.

Tests using the apparatus of FIG. 1 with $SrCl_2$ loaded into the reactor chamber at densities of 0.6 g/cc have given ammonia adsorption rates as high as 18 moles ammonia/mole $SrCl_2$ per hour initially, with average rates of 8–12 moles/mole after 15 minutes. Comparable tests without density control gives rates of about 2 to 5 moles/mole-hr. Similar results have been obtained with $CaCl_2$, $CaBr_2$, $CoCl_2$, $MgBr_2$, $MgCl_2$, $NaBr$, $SnCl_2$, $BaCl_2$, $MnCl_2$, $MnBr_2$, $NiCl_2$, $SrBr_2$, and $ZnCl_2$ activated carbon, and Na-zeolite.

Figure 3:
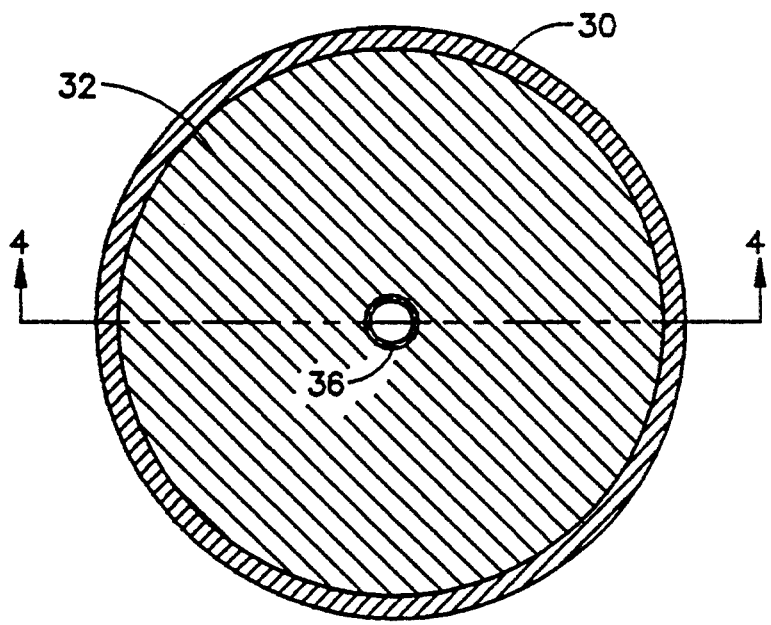
FIG. 3 illustrates another apparatus embodiment comprising a plurality of reaction chambers defined within an enclosed tubular wall with spaced plates secured therealong and incorporating a concentric perforated tube for directing gas to and from the reaction chambers.
Figure 4:
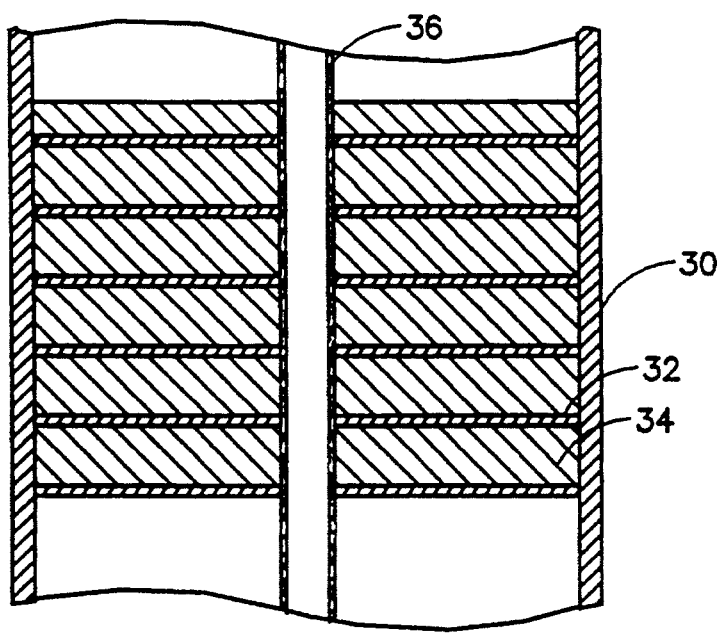
FIG. 4 is a partial sectional view taken along lines 4—4 of FIG. 3.

In FIGS. 3 and 4 there is illustrated another example of a chemisorption reaction system in which the reaction chambers are located within one or more elongated sleeves or reaction columns 30. Within the column are a plurality of stacked reaction chambers each containing a suitable amount of solid reactant 34 on reactant support trays 32. These support trays are secured to column 30 which allows the heat transfer from the complex compound to and from the reactant support trays to the column and refrigerant fluid. The gaseous reactant is diffused into the solid reactant 34 via perforated tube 36 which restrains the solid reactant from excess volumetric expansion within the reaction chambers. Again, other suitable means such as a wire mesh, foam, pumice or other porous means which allow the gaseous reactants to move to and from the reaction chambers may be substituted for the perforated tube 36.

The shape of the heat transfer column 30 and the reactant support trays 32 is not critical. It should also be appreciated that the depth or dimension of the reaction chambers may be varied to obtain optimum thickness, depending on the type of reactant used and the density of the complex compounds being used. Reactant layer thickness typically varies from over 1" to 0.05". Thin layers usually provide better heat transfer and increasing reaction rates, but returns diminish at very thin layers because diffusion becomes limiting and heat transfer no longer controls the reaction rate. Optimal thickness is a function of reactant properties. Thus, deeper reaction chambers may be preferred for some sorption reactions since it will maximize the ratio of solid reactant mass to the total mass of the system by utilizing fewer reaction chambers, fewer reactant support trays, thereby further decreasing reaction vessel costs and weight. Moreover, where reaction chamber space is increased to provide a concomitant increase in the amount of solid reactant used in the reactant vessel, the free volume of gaseous reactant is also minimized or reduced. This advantage is further enhanced since the limitation of the volumetric expansion of the solid complex compound reduces the porosity of the solid reactant thereby minimizing the amount of free gas used. Such gas utilization reduction is important for cyclic processes in which temperature and pressure vary, because energy is consumed in heating/cooling and/or compressing or expanding free gas with additional energy use or loss thereby effecting the efficiency of the overall system operation.

Figure 5:
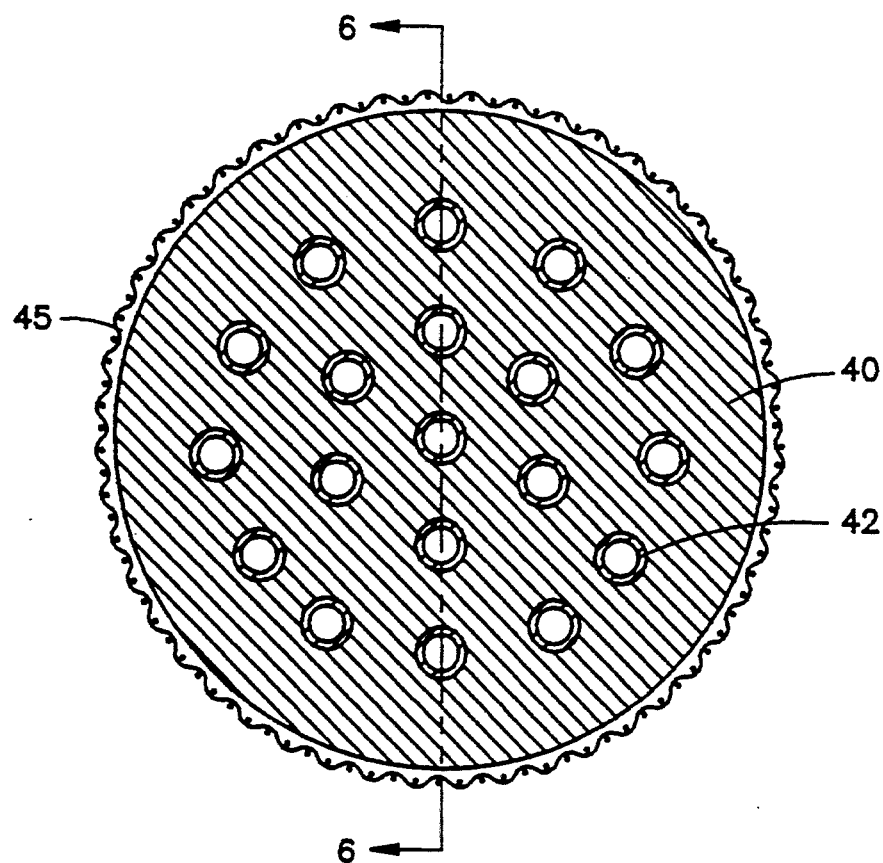
FIG. 5 illustrates an apparatus modification incorporating layers of spaced reactor beds in which the spaced reactor bed plates are secured within an elongated tube comprising the volumetric restriction means.
Figure 6:
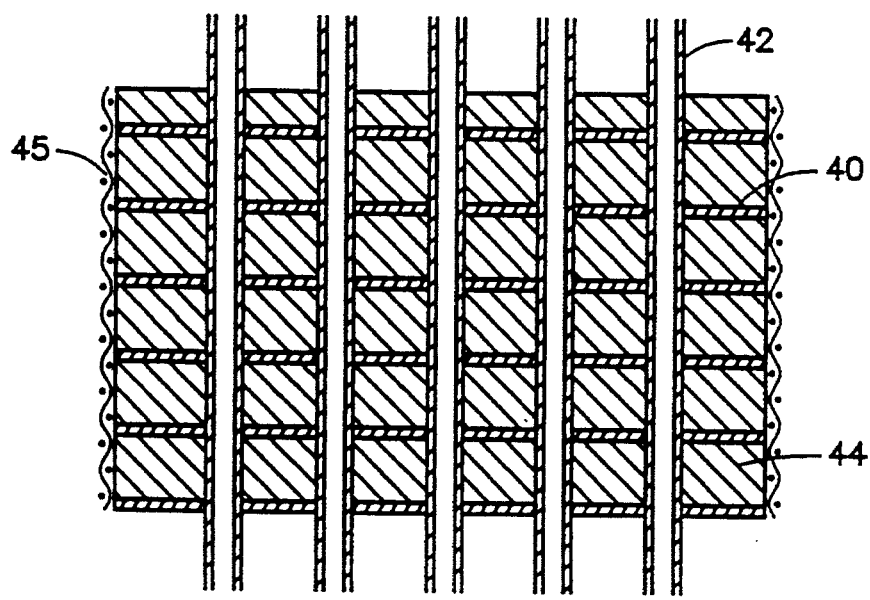
FIG. 6 is a sectional view taken along lines 6—6 of FIG. 5.

Another reactor configuration is illustrated in FIGS. 5 and 6 in which heat transfer conduits 42 extend through a plurality of reactant support trays 40 which are supported on the heat transfer conduits. Again, a suitable heat exchange fluid will pass through the heat transfer tubes to take advantage of the alternate heating and cooling caused by the chemisorption reaction occurring as the gaseous reactant is alternately adsorbed and desorbed from the solid reaction mass. Solid reactant 44 is illustrated in the plurality of reaction chambers located between the reactant support trays, with a wire mesh volumetric expansion barrier 45 secured around the exterior of the reactant support trays.

Figure 7:
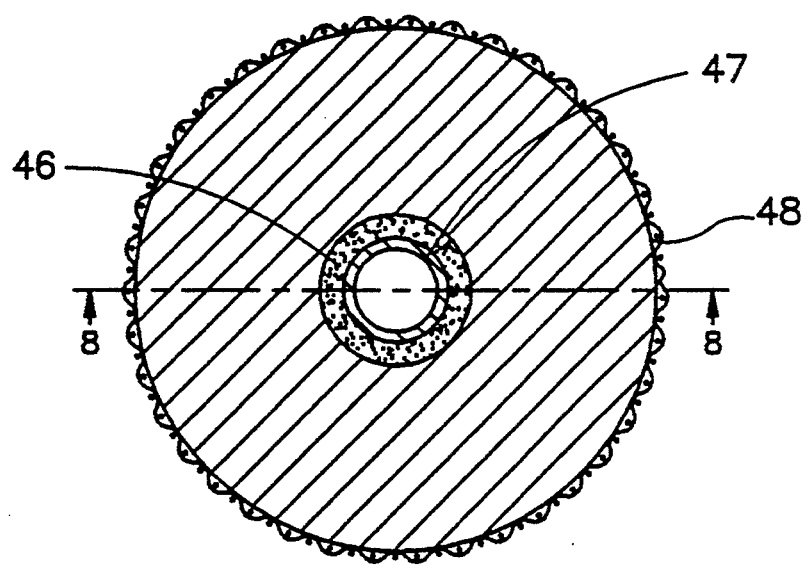
FIG. 7 illustrates another embodiment incorporating a porous sleeve along a heat transfer tube to provide a second path for gaseous reactant.
Figure 8:
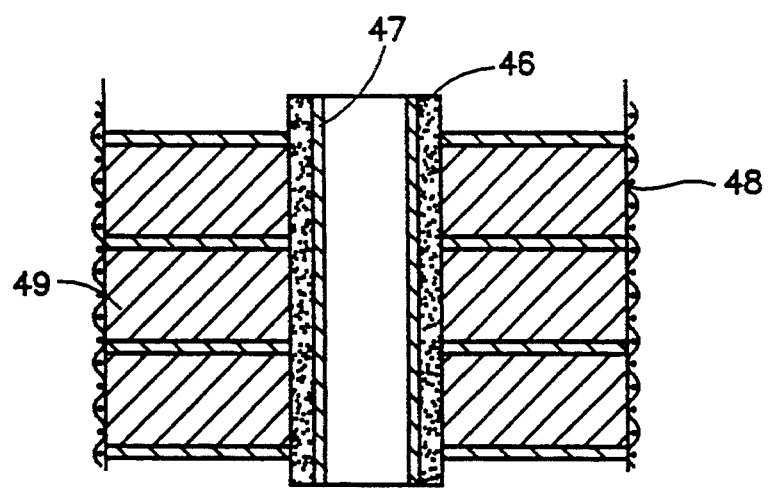
FIG. 8 is a sectional view taken along lines D—D of FIG. 7.

FIGS. 7 and 8 illustrate yet another embodiment similar to that of FIGS. 1 and 2 but incorporating a porous sleeve 46 which surrounds heat transfer tube 47 to allow gaseous reactant to have access to solid reactant 49 from both the inside and outside periphery. Larger overall diameters can be used because the diffusion path is reduced by a factor of two. Wire screen 48 surrounds the solid reactant column. Although a plurality of reactant support trays are shown in FIGS. 1-8, only an upper and lower end plates may be used, with the solid reactant formed in a column therebetween and encased within the wire mesh. Alternatively, any number of trays may be used along the column.

Figure 9:
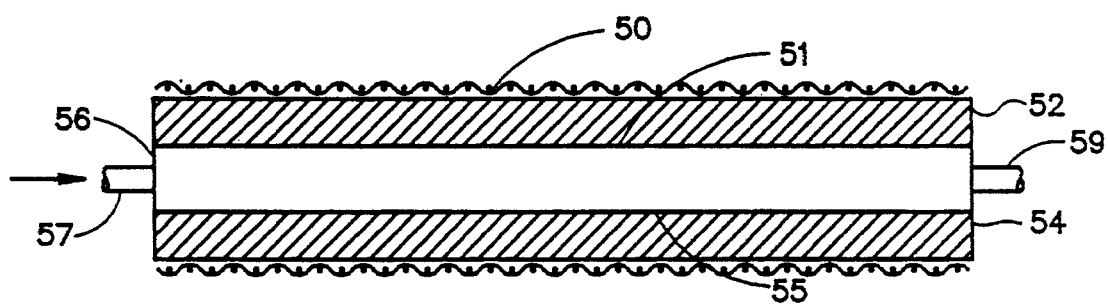
FIG. 9 is a side view showing another embodiment incorporating upper and lower layers of solid complex compound held against a central heat exchanger by volumetric expansion restriction means.

In FIG. 9 there is schematically illustrated yet another embodiment of the invention incorporating a wire mesh support screen 50 secured entirely around a heat exchanger 56 to create upper and lower reaction chambers. These reaction chambers are initially partially or completely filled with solid reactant 52 and 54, respectively, depending on the solid expansion, so that each reaction chamber is defined between the wire support screens 50 and the surface of the heat exchanger. The heat exchanger illustrated is shown from a side view so that the heat exchanger is viewed along its narrow component and having relatively wide upper and lower surfaces 51 and 55, respectively. The heat exchanger may also be circular or shaped differently and the specific shape is not particularly critical. It is to be understood that the heat exchange surface exposed to the solid reactant may be configured to maximize heat exchange efficiency to and from the solid reactant. An advantage of the design of this embodiment is the relatively large surface area of the solid reactant exposed to a gaseous reactant. Again, other materials which will restrict volumetric expansion and at the same time offer suitable gaseous movement to and from the reaction chambers and solid reactant may be used. A suitable heat exchange fluid will be transmitted via pipes 57 and 59 to and from the heat exchanger 56. The thickness of the solid reactant layers can be varied to achieve a desired gas diffusion path length.

Figure 10:
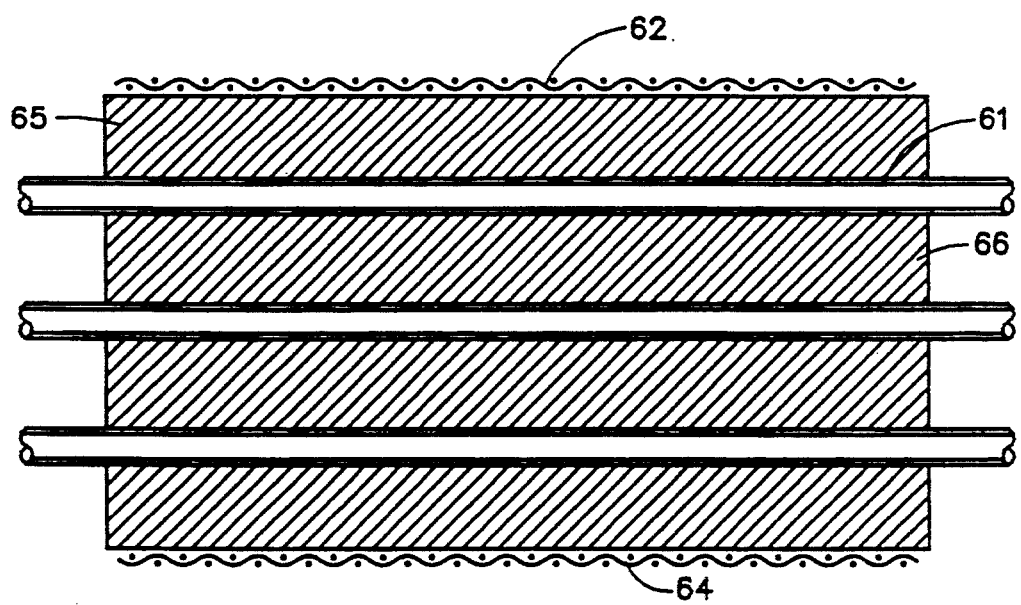
FIG. 10 is a sectional view showing yet another embodiment using multiple heat transfer plates separating layers of a solid-gas complex compounds all secured within volumetric expansion restriction means.

In FIG. 10 wire mesh 62 or other similar porous material for restraining the volumetric increase of solid reactants 65 and 66 is shown. In this embodiment, the perforated or mesh volume restriction member is on the outside of the plurality of reaction chamber in which a plurality of heat exchange plates 61, similar to that shown in FIG. 9, are positioned. Thus, the exterior or outside reaction chambers have the advantage of the relatively large solid surface exposed to the gaseous reactant with the interior reaction chambers being more limited with only their ends being exposed. However, the heat exchangers may have any suitable shape, including curved or otherwise differently shaped surfaces for taking advantage of the solid reactant to which each is exposed.

Figure 11:
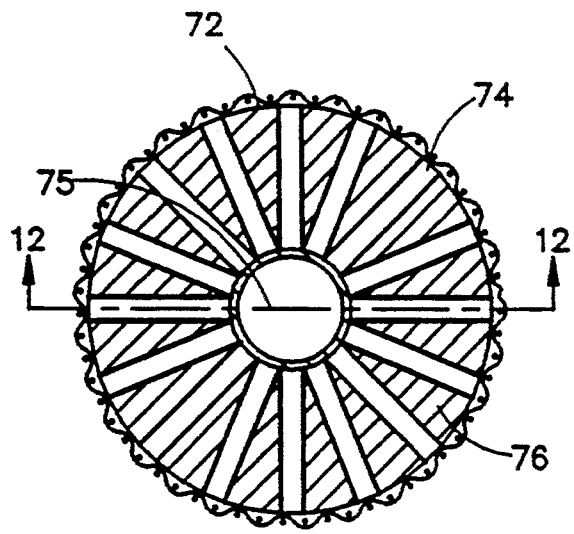
FIG. 11 is an end view illustrating yet another embodiment of the invention incorporating a column of solid reactant surrounding a heat transfer tube with a volume restraining wire mesh surrounding the column.
Figure 12:
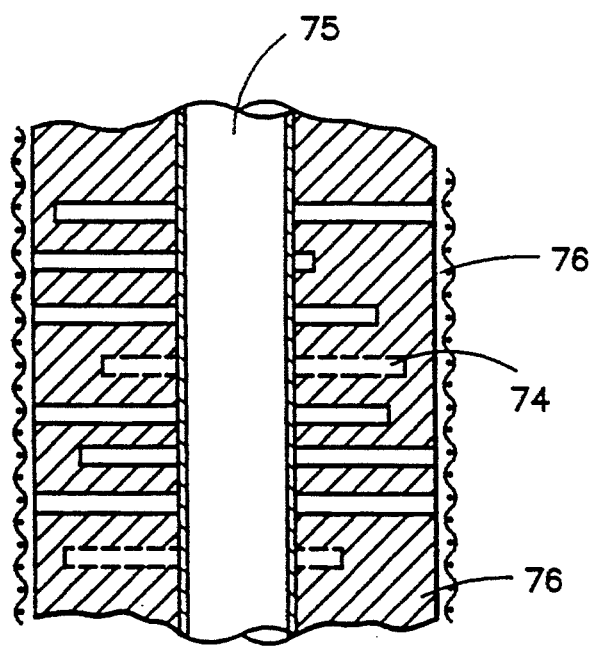
FIG. 12 is a sectional view taken along lines 12—12 of FIG. 9.
Figure 13:
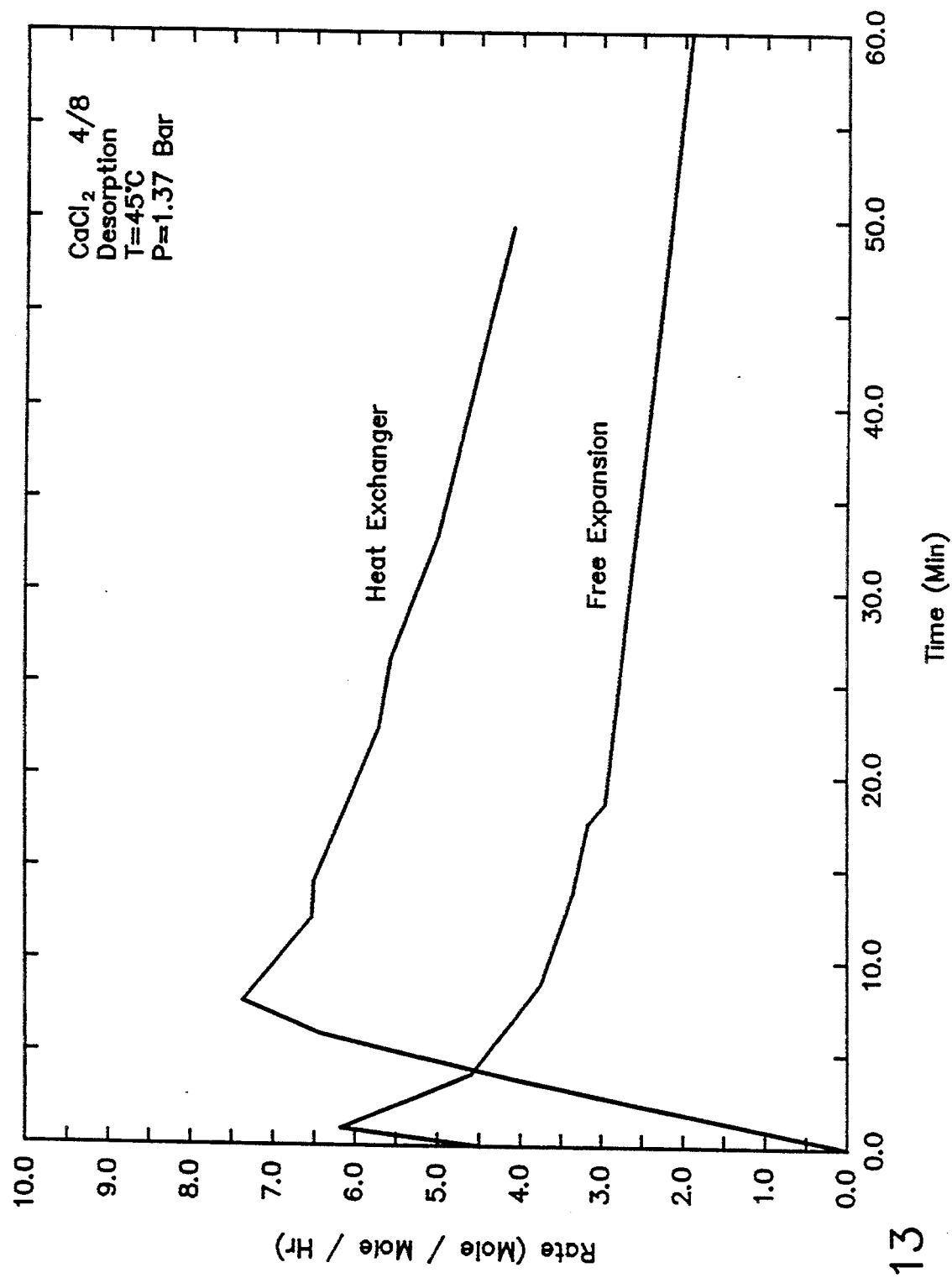
FIGS. 13–17 are graphs showing comparisons of reaction rates of various complex compounds using the system of the invention vs. free, uncontrolled expansion.
Figure 14:
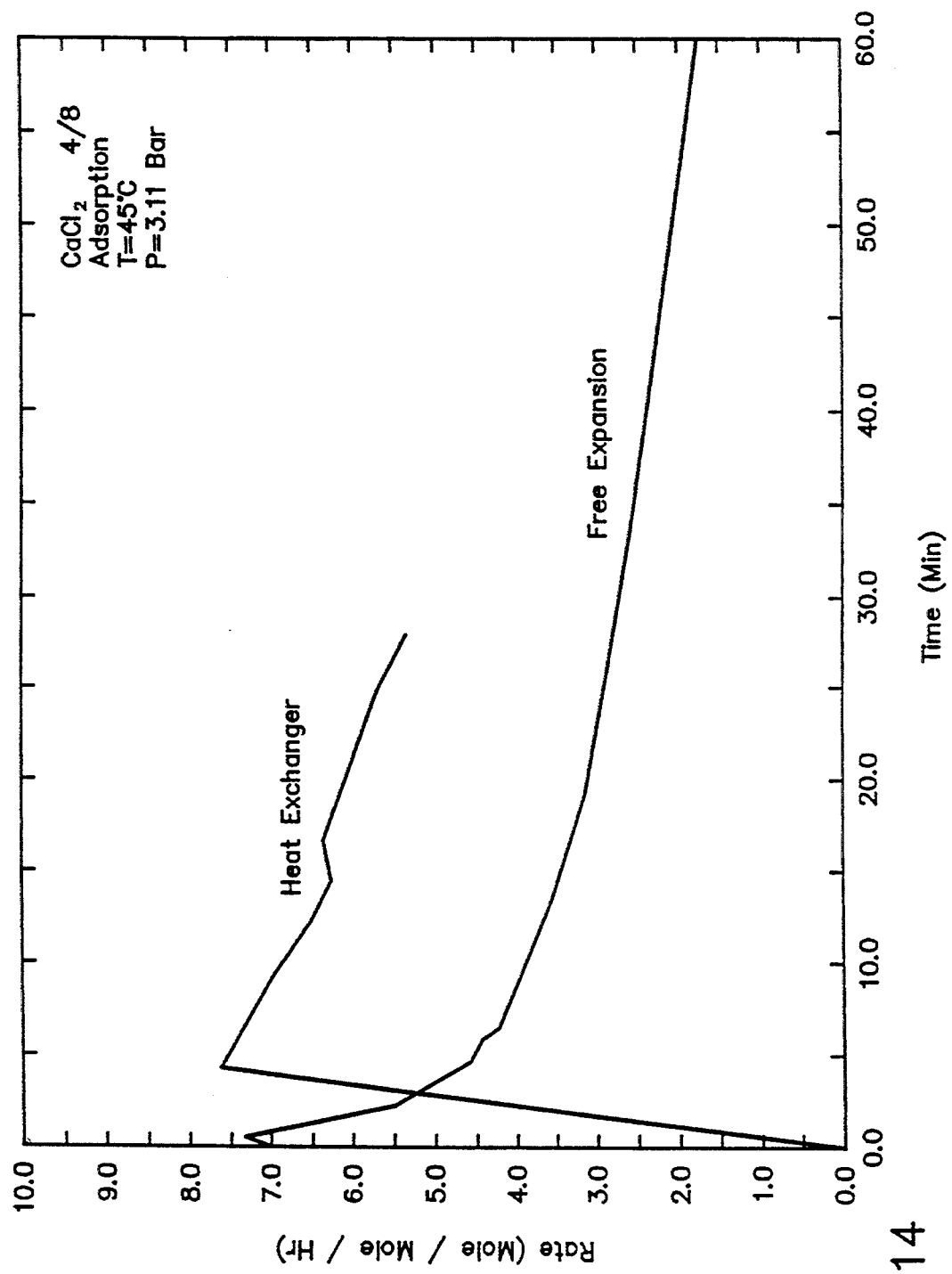
Figure 15:
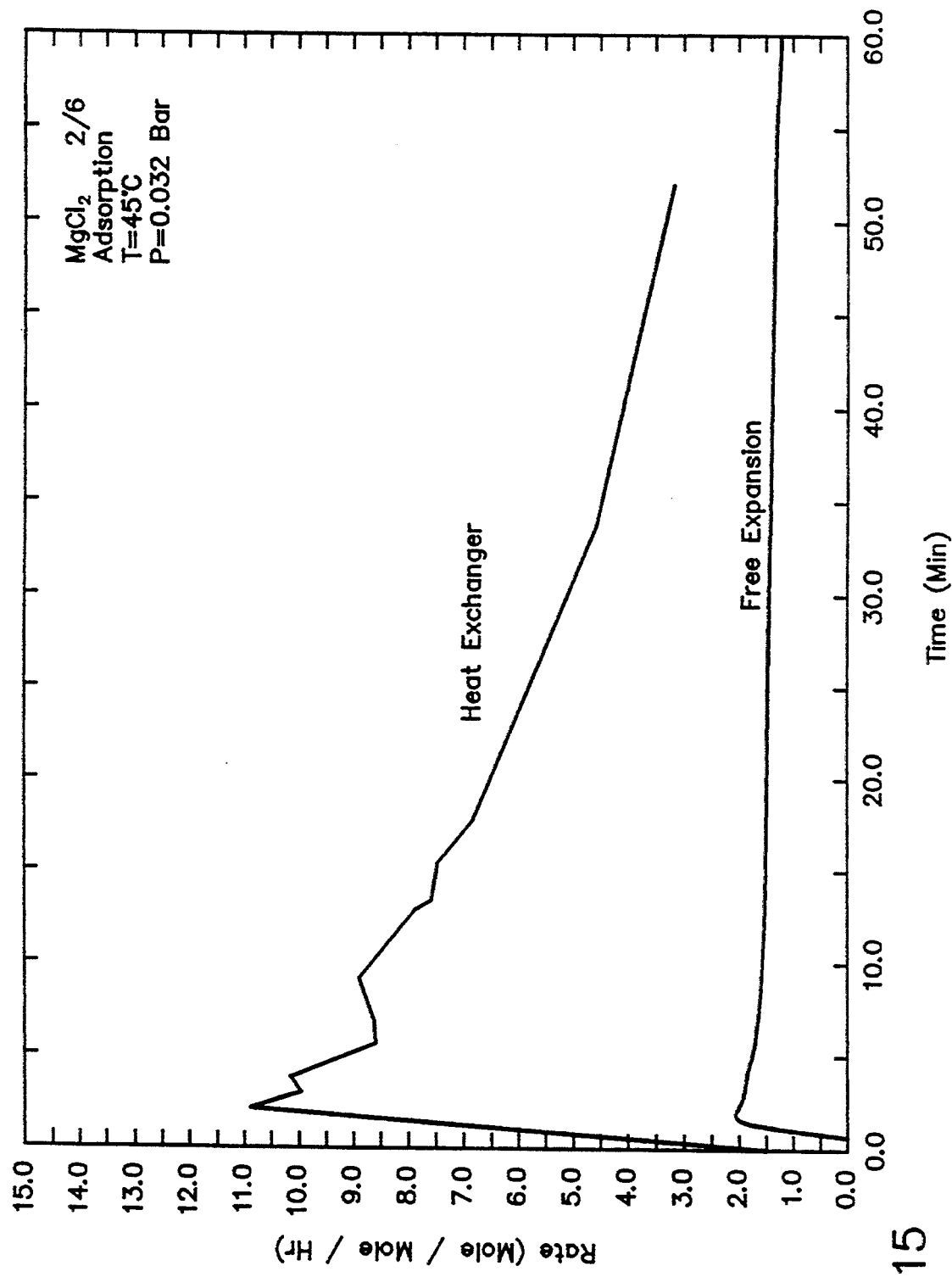
Figure 16:
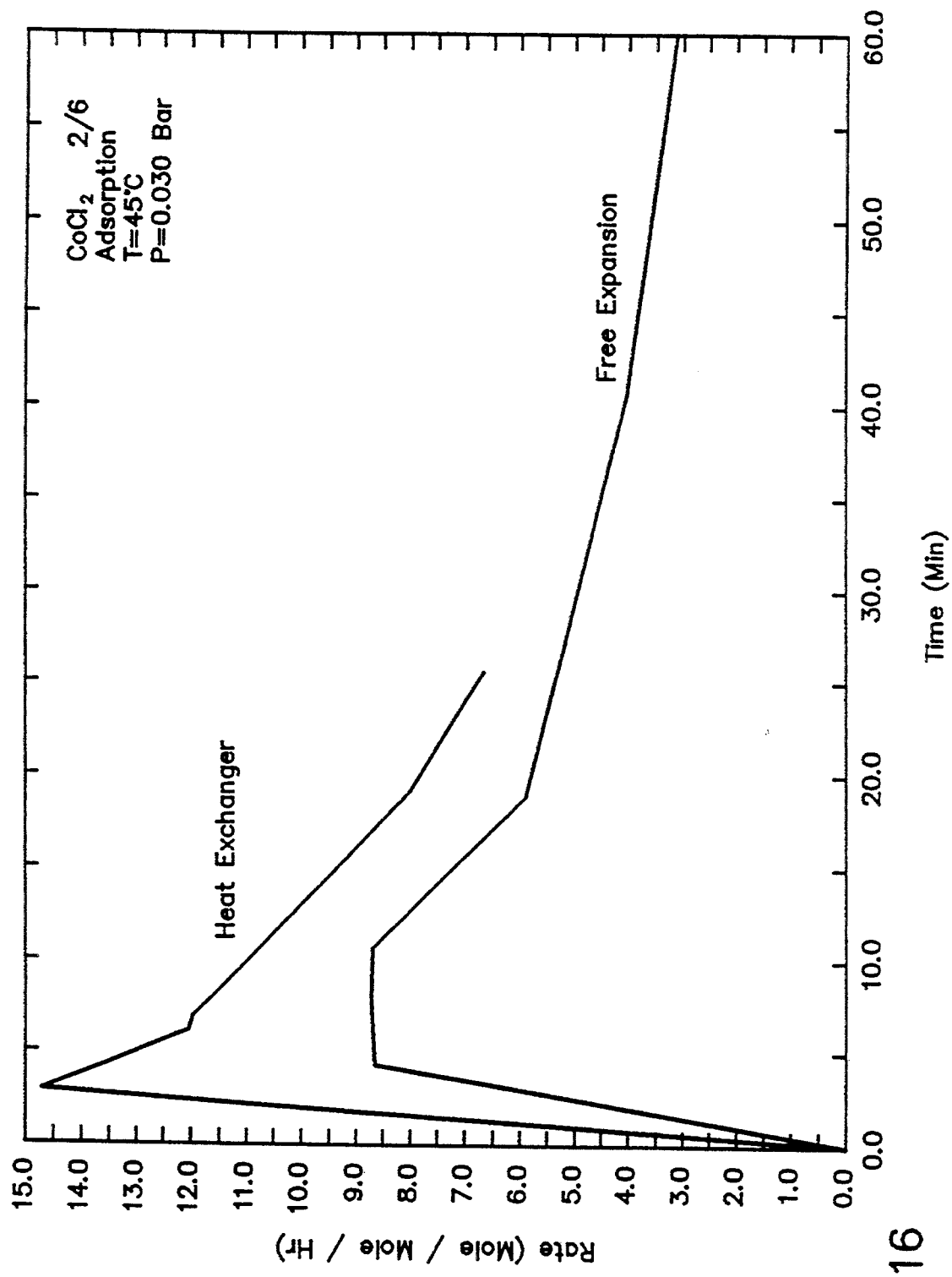
Figure 17:
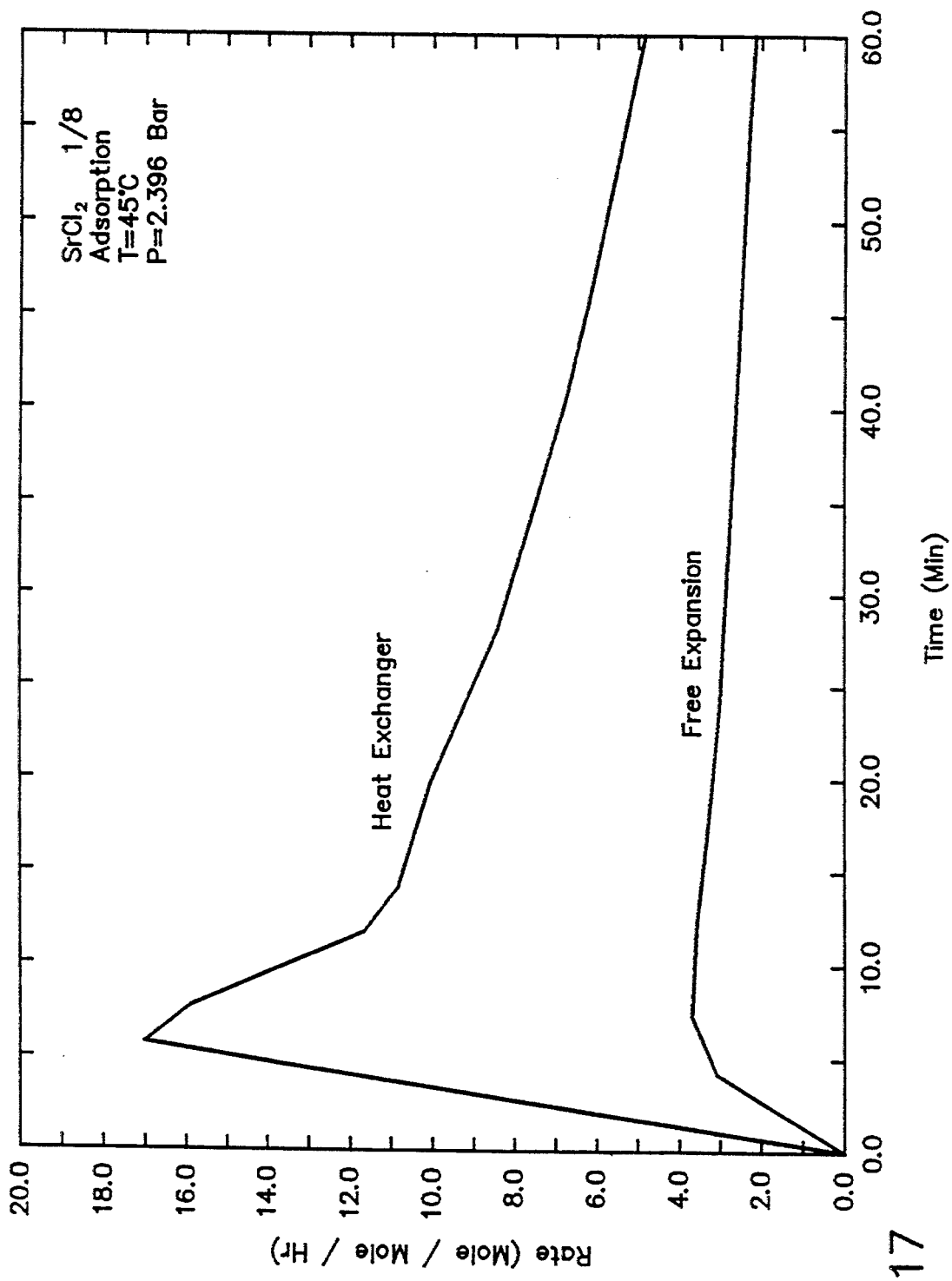

FIGS. 11 and 12 illustrate yet another embodiment in which volume restraining wire mesh 72 surrounds a column of solid reactant 76 supported around a plurality of heat exchange fins 74 extending radially from heat transfer tube or conduit 75. In FIG. 12, the fins not in the cross-section plane are shown with a phantom or hidden line. The length, shape and number of such heat exchange fins or their equivalent, may be selected to suit the particular needs of the apparatus and its intended function and performance requirements. The solid reactant column may be used in a heat exchange reactor in which the solid reactant alternately adsorbs and desorbs gaseous reactant. In such a reactor the open space may be flooded with suitable gaseous ligand which would then be adsorbed on the solid reactant. The components and features of such a gaseous-solid thermal system are known to those skilled in the art and are not explained in any further detail herein, not being part of the invention.

FIGS. 13–17 illustrate the improvement of the invention showing a comparison between various complex compounds during adsorption or desorption when allowed to expand freely and when the expansion is limited according to the invention. In the examples as shown, each of the adsorbents is placed in an apparatus as shown in FIGS. 1 and 2 whereby the expansion is restricted during the adsorption or desorption process. The salts as shown are complexed with ammonia ligand which is adsorbed or desorbed from the complex between the moles of ligand shown after the salt. Thus, in FIG. 13, $CaCl_2.8NH_3$ is desorbed to $CaCl_2.4NH_3$ with the heat transfer fluid temperature in the apparatus at 45° C., and the pressure in the reaction vessel at 1.37 Bar. The reaction rate is shown in moles of ammonia per mole of salt per hour. The graphs show clearly the improvement of the invention over free expansion of salts with significant improvement in reaction rates being achieved.

In another embodiment of the invention the reaction chamber volume is variable in the walls, trays and/or other components defining the chamber are movable. For example, the reactant trays may be free to move up and down along the heat transfer tube. Thus, in this embodiment, in the apparatus shown in FIGS. 1–8, the reactant support plates, are free to slide upwardly or downwardly along the heat transfer tube, gravitationally biased or urged toward one another when the tube is in a vertical or upright position. With the reactant solid between the trays, the trays are urged together against the solid to maintain a constant force and compression both during expansion and contraction. The wire mesh or other porous restraining means may also be slidable or movable in the apparatus. The reaction plates and/or the wire mesh may also be biased utilizing springs or other biasing means. Thus, in this embodiment, observing FIGS. 1–11, the wire mesh screen is biased such that it is urged and compressed against the solid reactant in the reaction chambers. Such a feature provides for automatically varying the reaction chamber volume as the reacting solids expand and contract. Such a movable reactor support and/or porous volume restraining means feature may be incorporated in any of the apparatus shown and described herein. This embodiment may be used with complex compounds having substantial expansion as previously described. However, the embodiment is also particularly useful where the reacting solids do not undergo substantial expansion, for example, certain metal hydrides and oxides and particularly zeolites, activated carbon and silica gel.

In another embodiment of the invention, optimum reaction density of a solid reactant is maintained in a reaction chamber having a fixed volume by mixing the solid reactant with a solid material which is inert to both the solid reactant and gaseous reactant at the chemisorption reaction conditions. The inert solid materials mixed with the solid reactants are preferably porous or particulate and of high thermal conductivity. With such properties, these additives allow for movement of the gaseous ligand reactants to and from the solid reactants, as well as to provide for heat transfer to and from the solid reactants and complex compounds in the reaction chambers as previously described. For this purpose, examples of suitable materials include $CaCl_2.2NH_3$, aluminum wool, porous metal granulates, alumina-silica solids, and the like. Such examples are not intended to be limiting in any way, and any porous and highly thermal conductive solid which is inert to the reactants as previously described in the chemisorption process conditions for example, temperature ranges between about −65° C. to about 1000° C. and pressures of between about 0.001 and about 150 atmospheres may be used. The amount of inert solid material will depend on the particular solid reactant being used, as-well as the particle size of the solid reactant and inert material. However, for most reactions, the amount of inert solid material between about 1 and about 60%, by weight of the mixture, will be suitable.

In using the mixture of the inert solid material and solid reactant, the reaction chamber may be partially or totally filled. However, where the chamber is partially filled, the amount of mixture will be such that when the solid mixture expands due to the formation of the complex compound, expansion will be limited by the volume of the reaction chamber. Thus, the volume of mixture used, even if less than the fixed volume of the reaction chamber will be such that the expanded solid reaction mixture would be greater than the volume of the reaction chamber if the reaction was carried out without volumetric restriction to the solid reactant. With such a system, one skilled in the art may select the optimum density of the solid reactant desired to be maintained during the chemisorption reaction, and select the amount of inert material to be mixed as well as the desired volumes of the solid mixture to be introduced into the fixed volume reaction chamber.

The improvement and advantages achieved utilizing a system and method employing solid-gas reactions as disclosed herein include industrial processing, and especially in cyclic processing in which the solid reactant is not consumed, but is continually regenerated in the alternating adsorption-desorption reactions. These processes include pressure swing and temperature swing adsorption reactions for separating gases, recovery of solvents from gas streams, removal of contaminants, adsorption heat pumps, thermal storage systems, refrigerators, and the like. The invention provides for decreased cost and higher reaction rates because of the substantially increased thermal conductivity at high density and ability to achieve optimum solid reactant porosity and thermal conductivity. Low cost and efficiency is further achieved by use of extended heat transfer surfaces as reactant support plates, thus providing short thermal paths through the solid reactant at low cost.

In systems in which the initial state of the solid reactant has excessive porosity, particularly the inclusion compounds such as zeolites, activated carbons and silica gel, the reactant is compressed to the optimum density in the reaction chamber at the time of loading and held to that density by the volume restricting means. Thus, when loading the inclusion compounds, or other solids having little or no volumetric expansion, they are introduced into the reaction chamber space and compressed, for example up to 20%, or more of their uncompressed or pour density. Such solids are also loaded into the reaction chamber to substantially fill the chamber space. The invention also improves systems in which the initial state of the solid reactant mass is of insufficient porosity, whereby the reactant is decompressed, typically by particle size reduction, or with addition of inert materials, and contained in the reactor at optimum density. In addition, because of compression of the reactant to optimum density against the heat transfer surface in each reaction chamber, improved heat transfer and thermal conductivity is achieved throughout the reactor. Moreover, the systems incorporating the invention have higher reaction rates and provide greater heat flux at heat transfer surfaces, require minimum volume of gaseous reactant, and maximize the ratio of solid reactant mass to total reactor mass. Such advantages over prior art systems yield lower cost per unit area supporting the solid reactant. These as well as other advantages of the invention will be evident to those skilled in the art as will various modifications, adaptations and features of apparatus components utilizing the concepts disclosed herein.

I claim:

1. A reaction apparatus comprising one or more reaction chambers containing a solid reactant adapted to form a reaction product by adsorbing and desorbing a gaseous reactant on said solid reactant said solid reaction product having an increased or decreased volume as compared to said solid reactant prior to said adsorption or desorption reaction, each of said one or more reaction chambers having a reaction chamber volume defined by reaction chamber walls and a reactant support surface, and wherein said reaction chamber walls and/or said reactant support surface are moveable and biased and form movable volumetric expansion control means for maintaining contact with said solid reactant and said reaction product substantially throughout said adsorption and said desorption reactions, whereby said reaction chamber walls and/or said reactant support surfaces provide moveable volumetric expansion control means for restricting the volumetric expansion and optimizing the density of said reaction product, and whereby said reaction chamber walls and said reactant support surface maintain contact with said of reaction product during said adsorption and desorption reactions.

2. The apparatus of claim 1 wherein said movable reactant support surface comprises a surface member extending laterally from a heat exchange conduit.

3. The apparatus of claim 1 wherein said solid reactant is selected from the group consisting of
   (a) a metal halide, oxide, sulfate, sulfite, nitrate, nitrite oxalate, hydride and carbonate in which the metal is an alkali metal, alkaline earth metal, transition metal, aluminum, or zinc;
   (b) a double metal salt in which the two metals are selected from strontium, sodium, aluminum, silver, gold, calcium, magnesium and cobalt;
   (c) ammonium chloride; and
   (d) a double metal salt in which one metal is an alkali or alkaline earth metal.

4. The apparatus of claim 1 wherein said gaseous reactant is selected from the group consisting of ammonia, water, carbon dioxide, sulfur dioxide, lower alkanols, alkyl amines, polyamines and phosphine.

5. The apparatus of claim 1 wherein said movable volumetric expansion control means for limiting the volumetric expansion of said solid reactant limits the expansion of said solid reaction product to between about 1.1 and 4.5 times the volume of said solid reactant introduced into said reaction chamber prior to exposure to said gaseous reactant.

6. The apparatus of claim 1 including a porous sleeve surrounding a heat transfer tube for allowing passage of said gaseous reactant.

7. The apparatus of claim 1 wherein said movable reactant support surface comprises a movable volumetric expansion control means.

8. The apparatus of claim 7 including a conduit containing a heat exchange fluid extending adjacent to said one or more reaction chambers and wherein said movable reactant support surface is in heat exchange communication with said conduit.

9. The apparatus of claim 7 wherein said movable reactant support surface is gravitationally biased for being urged against said solid reactant and solid reaction product during the reaction.

10. The apparatus of claim 1 wherein said movable volumetric expansion control means comprises movable porous material for allowing said gaseous reactant to pass to and from the solid reactant.

11. The apparatus of claim 10 wherein said movable volumetric expansion control means includes one or more movable reactant support surfaces biased for being urged against said solid reactant during the reaction.

12. The apparatus of claim 1 wherein said solid reactant is a compressed granular material selected from the group consisting of zeolites, activated carbon and silica gel.

13. The apparatus of claim 1 wherein said one or more reaction chambers contains a mixture of said solid reactant and a solid material inert to said solid reactant and said gaseous reactant.

14. The apparatus of claim 1 wherein said moveable reaction chamber wall is porous.

15. The apparatus of claim 14 wherein said porous wall comprises wire mesh.

* * * * *